(12) United States Patent
Pallay

(10) Patent No.: US 11,289,120 B1
(45) Date of Patent: Mar. 29, 2022

(54) STRESS-REDUCING GIMBAL TETHERS

(71) Applicant: Seagate Technology LLC, Freemont, CA (US)

(72) Inventor: Mark Pallay, Bloomington, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/212,960

(22) Filed: Mar. 25, 2021

(51) Int. Cl.
*G11B 5/48* (2006.01)

(52) U.S. Cl.
CPC ................. *G11B 5/4826* (2013.01)

(58) Field of Classification Search
CPC ...................................................... G11B 5/4862
See application file for complete search history.

(56) References Cited

U.S. PATENT DOCUMENTS

| | | | | |
|---|---|---|---|---|
| 7,898,772 B1 * | 3/2011 | Ziaei | .................... | G11B 5/4826 360/245.8 |
| 8,085,506 B1 * | 12/2011 | Ee | .......................... | G11B 5/486 360/245.8 |
| 8,089,731 B1 * | 1/2012 | Ma | ....................... | G11B 5/4826 360/245.3 |
| 8,208,224 B1 | 6/2012 | Teo et al. | | |
| 8,605,389 B1 * | 12/2013 | Pan | ....................... | G11B 5/486 360/245.9 |
| 8,792,213 B1 * | 7/2014 | Vijay | ..................... | G11B 5/486 360/245.3 |
| 8,797,690 B2 * | 8/2014 | Tao | .......................... | G11B 5/60 360/294.4 |
| 8,896,969 B1 * | 11/2014 | Miller | .................... | G11B 5/483 360/294.4 |
| 8,947,831 B1 * | 2/2015 | Ee | .......................... | G11B 5/483 360/245.3 |
| 8,970,989 B1 * | 3/2015 | Hahn | ................... | G11B 5/4833 360/245.9 |
| 8,976,491 B1 * | 3/2015 | Chen | .................... | G11B 5/4833 360/245.7 |
| 9,025,282 B1 * | 5/2015 | Miller | ................. | H05K 3/0061 360/245.3 |
| 9,064,513 B1 * | 6/2015 | Pan | ........................ | G11B 5/486 |
| 10,650,851 B1 * | 5/2020 | Atitallah | ............... | G11B 5/4833 |
| 10,957,350 B1 * | 3/2021 | Deokar | .................. | G11B 5/596 |
| 11,043,236 B1 * | 6/2021 | Pallay | .................. | G11B 5/4826 |
| 2006/0227464 A1 * | 10/2006 | Huang | ..................... | G11B 5/48 360/245.3 |
| 2007/0297094 A1 | 12/2007 | Sassine | | |
| 2010/0172057 A1 | 7/2010 | Zeng et al. | | |
| 2011/0096438 A1 * | 4/2011 | Takada | ................. | G11B 5/4853 360/244.2 |
| 2014/0285926 A1 | 9/2014 | McCaslin et al. | | |

(Continued)

*Primary Examiner* — Brian E Miller

(57) ABSTRACT

A head gimbal assembly for supporting a disk drive includes a flexure, a slider, a load beam and a gimbal affixed to the load beam. The flexure includes a first end extending along the load beam through a center region of a longitudinal axis of the head gimbal assembly and second end that includes a plurality of bond pads electrically coupled to the slider. The gimbal includes a detab, a connector region, a stator region and a central tongue region. The gimbal includes a gimbal tether configured to reduce stress on a first portion of the gimbal by coupling the first portion of the gimbal to a second portion of the gimbal.

20 Claims, 4 Drawing Sheets

(56) References Cited

U.S. PATENT DOCUMENTS

| | | | |
|---|---|---|---|
| 2015/0138739 A1* | 5/2015 | Hishiki | H05K 3/305 |
| | | | 361/760 |
| 2018/0005653 A1* | 1/2018 | Pokornowski | G11B 5/4873 |
| 2018/0070448 A1* | 3/2018 | Sakakura | H05K 3/10 |

* cited by examiner

STRESS-REDUCING GIMBAL TETHERS

TECHNICAL FIELD

The disclosure relates to a head gimbal assembly for a hard disk drive.

BACKGROUND

Hard disk drives (HDDs) utilize a slider to read and write data on magnetic storage media. In an HDD, the data is stored along a number of concentric tracks of the magnetic storage media. A voice coil motor (VCM) actuates a head gimbal assembly (HGA), which allows precise positioning of a data read/write head over the tracks by allowing the transducer to move along multiple axes over the media. The read/write transducer generally includes an air bearing surface, which floats or flies above the disc surface in a known manner. Generally, the slider flies with a positive pitch angle at which the leading edge of the slider flies at a greater distance from the disc surface than the trailing edge via a suspension assembly, which includes a load beam and a gimbal. The slider is coupled to the load beam via the gimbal. As track density increases with increased storage capacities, it becomes more difficult to stay on-track during read/write operations. This difficulty is amplified when the drive is subject to internal and external vibrations or shock, which cause the transducer to shift off-track. During a shock event, for example dropping the HDD, the mass of the read/write head can pull the gimbal away from the load beam. The shock event can induce stress in the gimbal. This stress may be enough to bend the gimbal resulting in changes to the pitch angle of the gimbal and in some cases, the deflection could be large enough to cause the stress to reach the gimbal's yield point, which could cause gimbal separation resulting in disc drive failure.

SUMMARY

The present disclosure describes a head gimbal assembly (HGA) for a hard drive. The HGA includes a load beam and a gimbal connected to the load beam. The HGA includes a gimbal tether that is configured to reduce stress in the HGA during shock events. In one example, the gimbal tether couples adjacent portions of the gimbal to one another. For example, placing a gimbal tether at a region of high stress but low deflection may alleviate stress in these regions while minimizing impact to other performance metrics (for example, gain, gimbal stiffness, and stroke). Alleviating stress in the HGA may, in some scenarios, reduce the likelihood of damaging components of the HGA during a shock event such as dropping a hard-drive, which may improve longevity and/or reliability of the hard drive.

In one example, a head gimbal assembly for supporting a disk drive includes a slider, a load beam, a gimbal affixed to the load beam including a detab located at a distal region of the load beam, a stator region configured to support the slider and a central tongue region where the slider is coupled to the load beam. The gimbal further includes a gimbal tether that is configured to reduce stress on a first portion of the gimbal by coupling the first portion to a second portion of the gimbal.

These and other features and aspects of various examples may be understood in view of the following detailed discussion and accompanying drawings.

DETAILED DESCRIPTION

Figure 1:
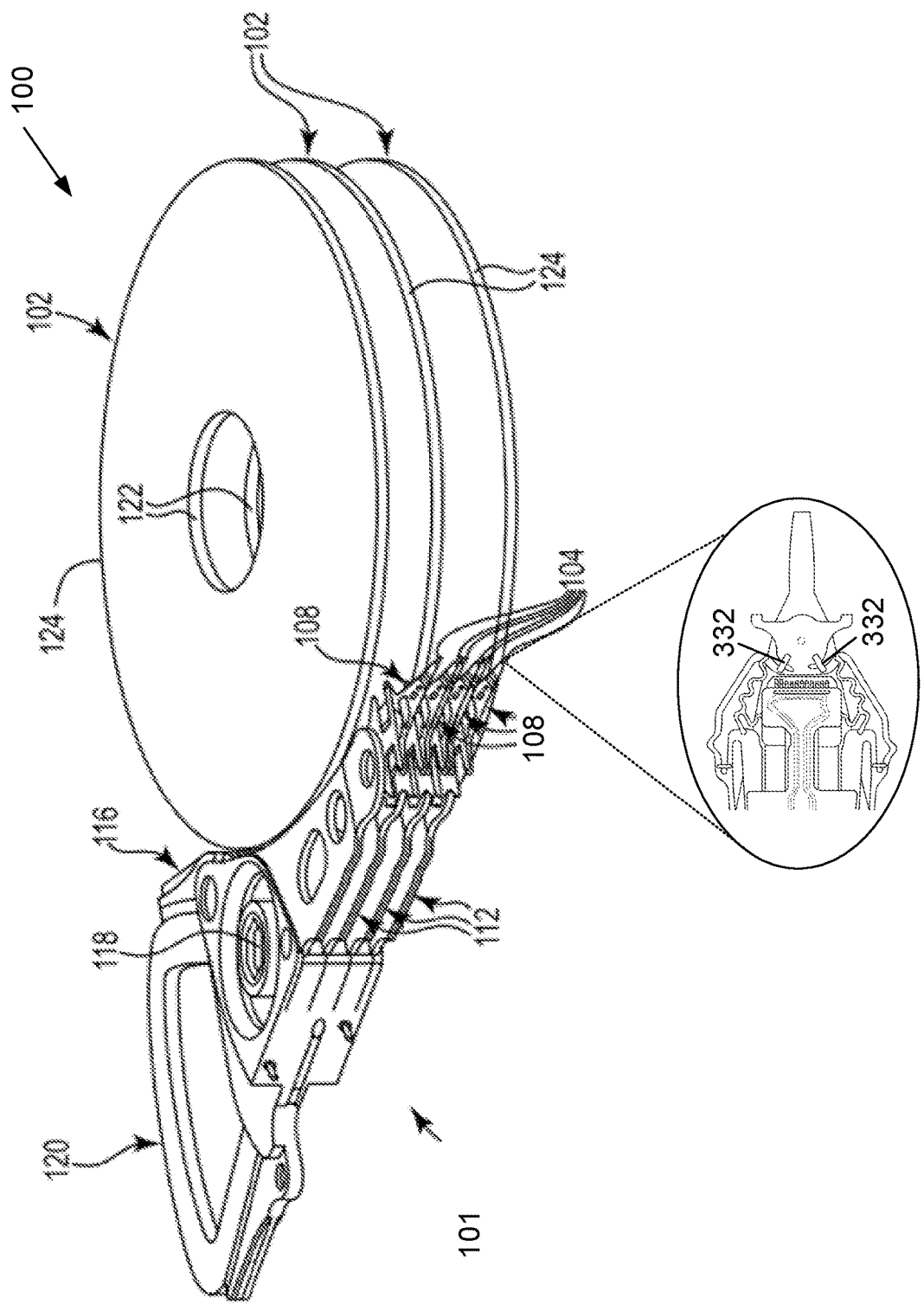
FIG. 1 is a perspective view of a hard disk drive, according to various aspects of the present disclosure.

FIG. 1 is a perspective view of a hard disk drive, according to various aspects of the present disclosure. Hard disk drive 100 includes a head stack assembly 101 and magnetic media 102. In one example, magnetic media 102 includes magnetic disks that each store information or data in a plurality of circular, concentric data tracks.

Head stack assembly 101 includes a voice coil drive actuator 120, an actuator mechanism 116, shaft 118, a plurality of rotatable drive actuator arms 112, and a plurality of head gimbal assemblies 108. Head stack assembly 101 also includes gimbal tethers 332, which are further described with reference to FIG. 3. Voice coil drive actuator 120 is controlled by servo control circuitry. Voice coil drive actuator 120 is configured to rotate actuator mechanism 116 about shaft 118 in either rotational direction. Rotatable drive actuator arms 112 are each coupled to a respective HGA of HGAs 108, such that rotating actuator mechanism 116 causes rotatable drive actuator arms 112 and HGAs 108 to move relative to magnetic media 102. Each HGA 108 includes a respective slider 104. Positioning HGAs 108, and thus sliders 104, over the surfaces of magnetic media 102, between inner diameters 122 and outer diameters 124 of magnetic media 102 enables sliders 104 to read data from and write data to magnetic media 102. In some examples, sliders 104 are themselves aerodynamically designed to fly on an air bearing that is created adjacent to each disk surface during disk rotation.

Figure 2:
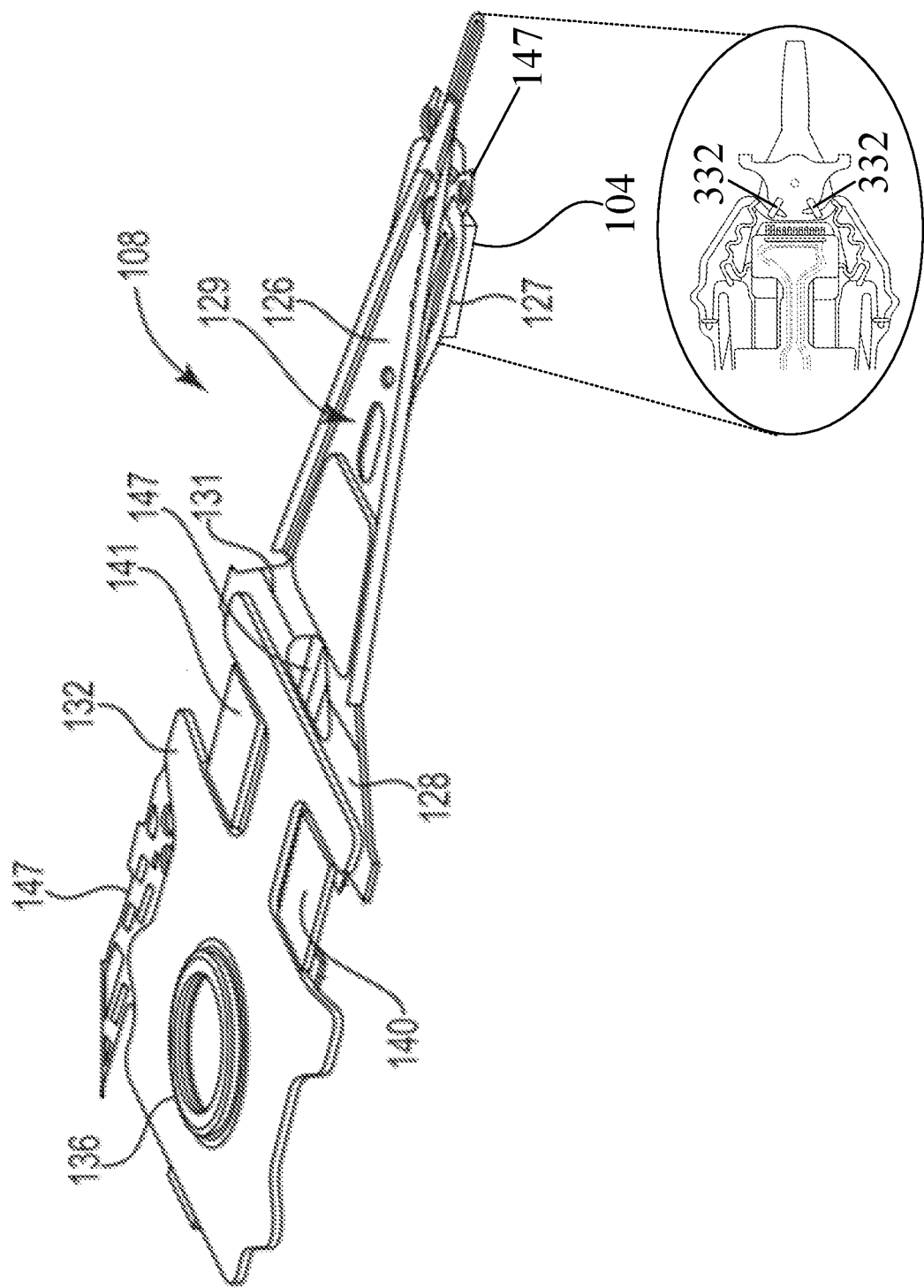
FIG. 2 is a perspective view of an example head gimbal assembly, according to various aspects of the present disclosure.

FIG. 2 is a perspective view of HGA 108 of FIG. 1, according to various aspects of the present disclosure. HGA 108 includes a baseplate or mount 132, a load beam 126, a gimbal 127, and a slider 104. HGA 108 includes gimbal tethers 332, which are further described with reference to FIG. 3.

Baseplate 132 includes an attachment structure 136, such as a boss tower, that is configured to couple to actuator arm 112 of FIG. 1. In one example, attachment structure 136 is integrally formed with baseplate 132. Baseplate 132 and attachment structure 136 may each be made of a ferrite (e.g., stainless steel) or other suitable material (e.g., aluminum, engineered plastic, and the like).

In one example, load beam 126 includes a base portion 128, a hinge region 131, and a rigid region 129. Load beam 126 may be made of a ferrite (e.g., stainless steel) or other suitable material. Base portion 128 of load beam 126 is mechanically coupled to baseplate 132. In some examples, base portion 128 is coupled to baseplate 132 via welding (e.g., laser welding). Hinge region 131 (also referred to as a spring region) provides load beam 126 with a preload force that acts against the lift force action of slider 104 as slider 104 flies relative to the disk surface. The preload force urges slider 104 towards the surface of a magnetic media 102 during flight to maintain a desired fly height. In some examples, hinge region 131 is integrated with and contiguous with load beam 126 as a single part.

Rigid region 129 of load beam 126 extends from hinge region 131 to the tip of the HGA 108. In the example of FIG. 2, hinge region 131 is disposed between base portion 128 and rigid region 129.

Gimbal 127 provides a slider mounting portion that is pivotable about a dimple on load beam 126, as provided from an end portion of the rigid region 129 of the load beam 126. Gimbal 127 provides a moveable slider mounting pad to which slider 104 is attached so that slider 104 can move in the pitch, roll, and yaw directions in response to variations while flying relative to a disk surface.

As shown in the example of FIG. 2, HGA 108 includes a pair of microactuators 140 and 141. While voice coil drive actuator 120 of FIG. 1 rotates actuator mechanism 116 to provide relatively coarse positioning of sliders 104, microactuators 140 and 141 provide HGA 108 with relatively fine or precision positioning of slider 104 at the surface of magnetic media 102. In one example, microactuators 140 and 141 are piezoelectric microactuators. Piezoelectric microactuators convert an electrical signal into controlled physical displacements. In another example, microactuators 140 and 141 include lead zirconate titanate (PZT)

In some examples, HGA 108 includes flexure 147. Flexure 147 includes a plurality of electrical conductors (also referred to as electrical leads or electrical traces) that provide electrical signals for communication with the read and write heads of slider 104 as well as for microactuator control. In some examples, flexure 147 includes a substrate or bottom layer of insulating material (e.g., polyimide), capped with a top layer of insulating material (e.g., polyimide) with a layer of semi-rigid conducting material (e.g., copper or stainless steel) disposed between the top and the bottom insulating layers.

Flexure 147 may, in some examples, be bonded along HGA 108. In reference to FIG. 2, flexure 147 runs along load beam 126 from the base portion 128 to rigid region 129 to electrically connect with the read/write head of the slider 104.

Figure 3:
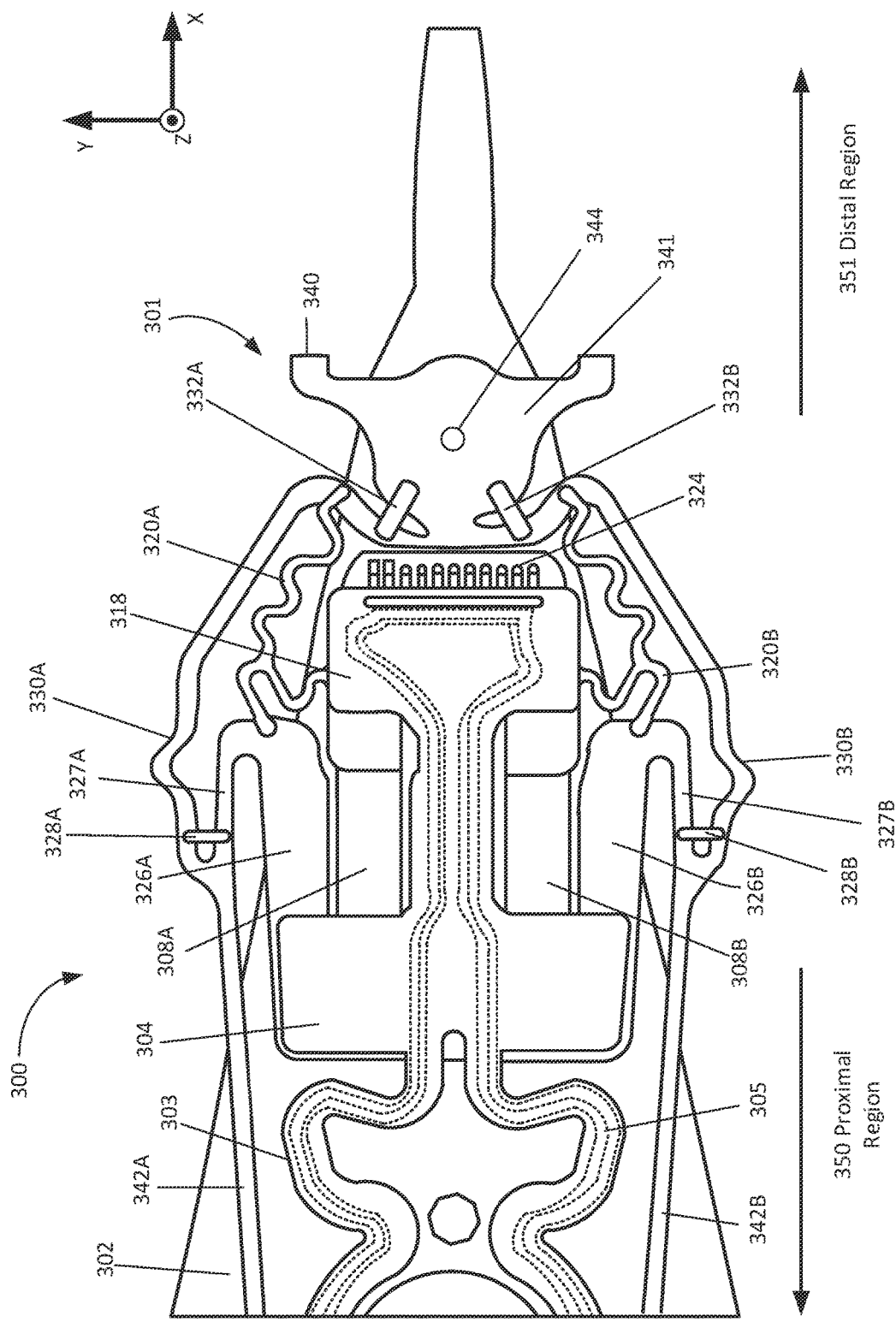
FIG. 3 is a bottom view of an example head gimbal assembly, according to various aspects of the present disclosure.

FIG. 3 is a bottom view of an example head gimbal assembly, according to various embodiments of the present disclosure. Head gimbal assembly 300 is an example of head gimbal assembly 108 of FIGS. 1 and 2. In the example of FIG. 3, head gimbal assembly 300 includes a gimbal 301, a load beam 302, a flexure 303, a plurality of microactuators 308A and 308B (collectively, microactuators 308), a plurality of flexible tethers 320A and 320B (collectively, flexible tethers 320), gimbal tethers 328A and 328B (collectively, gimbal tethers 328), and gimbal tethers 332A and 332B (collectively, gimbal tethers 332).

Load beam 302 has longitudinal length (e.g., along the x-axis) and includes proximal region 350 and distal region 351 that is opposite proximal region 350. Proximal region 350 includes the leading edge of the head gimbal assembly 300 and the distal region 351 includes the trailing edge of the head gimbal assembly 300. The terms "leading edge" and "trailing edge" refer to the direction of travel of the magnetic media underneath the slider. In the example shown in FIG. 3, the magnetic media travels from the proximal region 350 of the head gimbal assembly 300 to the distal region 351 of the head gimbal assembly 300.

In the example of FIG. 3, flexure 303 is configured to electrically connect the read and write heads of the slider to an external control system. Flexure 303 can include any number of electrical leads or traces 305.

Flexure 303 extends along the load beam 302 through a center region of a longitudinal axis (e.g., x-direction) of head gimbal assembly 300. A first end of flexure 303 is tethered to stator region 304 towards the proximal region 350 of head gimbal assembly 300. A second end of flexure 303 is connected to central tongue region 318 towards the distal region 351 of the load beam 302. In some examples, flexure 303 includes a plurality of stacked layers, such as one or more conducting layer and one or more insulating layer. In some examples, the stacked layers include a top layer of insulating material (e.g., polyimide), a middle layer of conducting material (e.g., copper, stainless steel, or an alloy conductor), and a bottom layer of insulating material.

Flexure 303 includes a plurality of bond pads 324. Flexure bond pads 324 provide a termination point for a second end of flexure 303 at central tongue region 318 of the load beam 302. Bond pads 324 are electrically connected to the slider bond pads (not shown), typically by solder ball bonding.

Gimbal 301 has a top surface and a bottom surface. The bottom surface of gimbal 301 is configured to face the magnetic media side of the load beam 302. In some examples, gimbal 301 provides support for flexure 303 and is coupled to load beam 302 at weld point 344 on connector region 341. In some examples, gimbal 301 may be made from stainless steel.

Gimbal 301 includes a stator region 304, central tongue region 318, detab 340, and connector region 341. Stator region 304 is configured to secure a first portion of the slider. Gimbal 301 is configured to enable the slider to move in pitch and roll directions while flying relative to the disk surface. Central tongue region 318 is disposed between connector region 341 and stator region 304 and is configured to secure a second portion of the slider including electrical connections to the flexure (e.g., the portion of the slider that includes the slider bond pads, which couple to bond pads 324 of flexure 303). In some examples, gimbal 301 may be coupled to flexure 303 at stator region 304 and central tongue region 318. Flexure 303 is disposed between gimbal 301 and the slider within stator region 304 and central tongue region 318.

Connector region 341 is configured to couple gimbal 301 to load beam 302. Connector region 341 of gimbal 301 includes detab 340 that is located at a distal region 351 of head gimbal assembly 300 and that is configured to support gimbal 301 during gimbal manufacture.

Gimbal 301 includes rear gimbal struts 342A and 342B (collectively, rear gimbal struts 342), outer gimbal struts 330A and 330B (collectively, outer gimbal struts 330), inner gimbal struts 326A and 326B (collectively, inner gimbal struts 326) and middle gimbal struts 327A and 327B (collectively, middle gimbal struts 327). Middle gimbal struts 327 and outer gimbal struts 330 are coupled to and extend from rear gimbal struts 342 at a location approximately adjacent to inner gimbal struts 326. Outer gimbal struts 330 lie outside central tongue region 318 and couple to connector region 341 toward a distal region 351 of head gimbal assembly 300.

Microactuators 308 each extend from stator region 304 to tongue region 318. Microactuators 308 are substantially parallel to each other. In some examples, inner gimbal struts 326 are adjacent (e.g., within approximately 10-100 microns) to microactuators 308 and may extend from stator region 304 toward tongue region 318 of head gimbal assembly 300. In one example, an inner edge of gimbal struts 326 may be substantially parallel (e.g., within 3-degrees) to an edge of microactuators 308.

Flexible tethers 320 are configured to act as stabilizers by restricting vertical movement of slider 104 toward the media (e.g., in the z-direction (out of the page)). In the example of FIG. 3, flexible tethers 320 are coupled to inner gimbal strut 326, central tongue region 318, and outer gimbal struts 330. However, in some examples, flexible tethers 320 may couple at additional or fewer locations. In one example, flexible tethers 320 may be close to 1 millimeter (+/−0.1 millimeter) in length (in the x-direction). In some examples, flexible tethers 320 include a polyimide layer.

In the example of FIG. 3, head gimbal assembly 300 includes a plurality of gimbal tethers 328 and 332 that are each configured to relieve stress experienced by outer gimbal struts 330 during operation. In one example, gimbal tethers 328 are disposed in areas of high stress (e.g., at least approximately 500 kPa). In some examples, gimbal tethers 328 and 332 are disposed in areas of low displacement in the z-direction (e.g., less than or equal to approximately 1 μm). Each of gimbal tethers 328 and 332 are disposed on gimbal 301 and couple a first portion of gimbal 301 to a second portion of gimbal 301. In some examples, gimbal tethers 328 and 332 are configured to reduce stress on a first portion of the gimbal by coupling the first portion of the gimbal to a second portion of the gimbal.

FIG. 3 illustrates two pairs of gimbal tethers 328 and 332. Gimbal tethers 328 extend from middle gimbal struts 327 and couple to outer gimbal struts 330. In some examples gimbal tethers 328 and 332 are straight and the inner edge and outer edge of each gimbal tether are parallel to each other. In one example, gimbal tethers 328 couple middle gimbal struts 327 and outer gimbal struts 330 at a location approximately midway between stator region 304 and central tongue region 318. In some instances, gimbal tethers 328 are located in a region of high stress and low vertical displacement of head gimbal assembly 300. For instance, gimbal tethers 328 may be located proximate to {e.g., within approximately 0.15 mm} a location where rear gimbal struts 342 couple to outer gimbal struts 330 and middle gimbal struts 327.

Gimbal tethers 332 are located at a distal region 351 of HGA 300. Gimbal tethers 332 extend from connector region 341 toward central tongue region 318 of HGA 300 and couple to outer gimbal struts 330. In one example, gimbal tethers 332 are located proximate to (e.g., within approximately 0.15 mm) the location where outer gimbal struts 330 connect with connector region 341. Gimbal tethers 332 may also be located in a region of high stress and low vertical displacement of head gimbal assembly 300.

In the example of FIG. 3, gimbal tethers 328 and 332 are shorter in length than flexible tethers 320. For example, gimbal tethers 328 and/or 332 may be approximately 0.1 millimeter (+/−0.01 millimeters) in length. Gimbal tethers 328 and 332 may be up to approximately 1000 times stiffer than flexible tethers 320.

In some examples, gimbal tethers 328 and 332 may comprise polyimide. In one example, gimbal tethers are not electrically active during operation of the HDD. That is, in some examples, gimbal tethers 328 and 332 do not provide electrical signals for communication with the read and write heads of slider 104. The placement of gimbal tethers may change with HGA design, with the desired location typically being in areas of high stress but low relative z-displacement (normal to the gimbal surface) between the two attachment points of the tether (e.g., less than or equal to approximately 1 μm).

Figure 4:
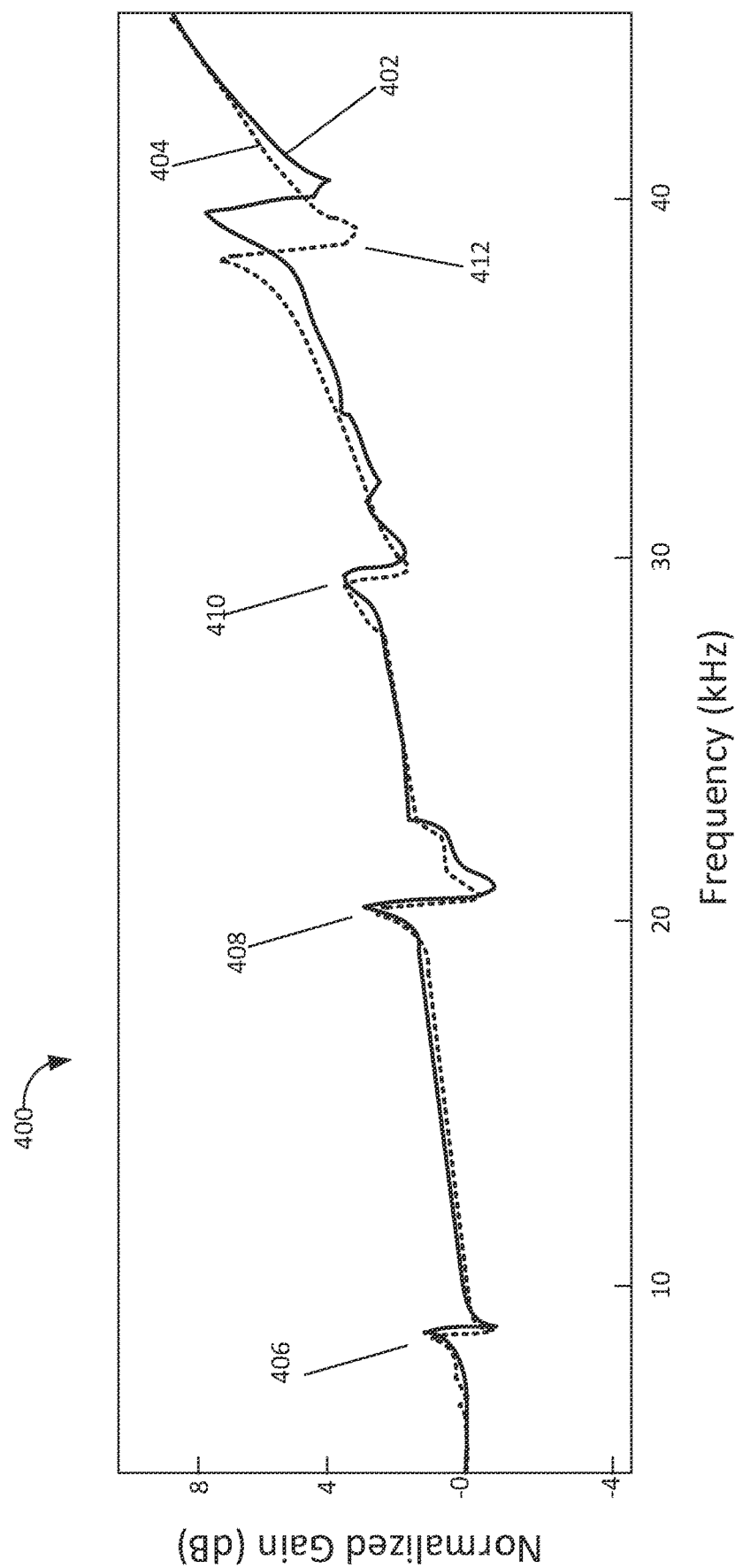
FIG. 4 is a Bode Plot of frequency response of an example head gimbal assembly, according to various aspects of the present disclosure.

FIG. 4 is a Bode Plot of frequency response of an example head gimbal assembly, according to various aspects of the present disclosure. In hard disk drives there are several sources of excitation that can cause the head gimbal to resonate at different frequencies. In some examples, the resonant frequency of head gimbal assembly 300 corresponds to an increase in amplitude of oscillation that is equal to or very close to the natural undamped frequency of head gimbal assembly 300. Vibration of the suspension at a resonant mode can interfere with accurate positioning of the slider, thus hard disk drive electronics are designed in such a way as to accept a certain amount of amplitude at certain frequency ranges. In some instances, increasing stiffness and/or lowering mass of head gimbal assembly 300 may reduce the off-track response of the slider.

As shown in FIG. 4, multiple peaks in the Bode plot can be observed at specific frequencies and these peaks represent multiple resonance modes of head gimbal assembly 300 of FIG. 3. In the example of FIG. 4, the dotted line plot 404 represents the frequency response of an example HGA that does not comprise gimbal 301 with gimbal tethers 328 and 332. Solid line plot 402 represents the frequency response of HGA 300 comprising gimbal 301 with gimbal tethers 328 and 332. FIG. 4 illustrates a number of gimbal torsion modes 406, 408, 410 and 412. The addition of gimbal tethers 328 and 332 to gimbal 301 do not significantly change the frequency response of gimbal torsion modes 406, 408 and 410 though fourth gimbal torsion mode 412 at ~ 40 kHz a shift to slightly higher frequency (an increase of ~2 kHz). This slight increase in frequency may be as a result of increase in the stiffness of gimbal 301 utilizing gimbal tethers 328 and 332.

Various examples have been presented for the purposes of illustration and description. These and other examples are within the scope of the following claims.

What is claimed is:

1. A head gimbal assembly for a hard disk drive, the head gimbal assembly comprising:
    a slider;
    a load beam;
    a flexure comprising:
        a first end extending along the load beam through a center region of a longitudinal axis of the head gimbal assembly;
        a second end comprising a plurality of bond pads electrically coupled to a slider; and
    a gimbal affixed to the load beam, the gimbal comprising:
        a connector region that couples to a distal region of the load beam;
        a stator region configured to support a first portion of the slider;
        a central tongue region disposed between the connector region and the stator region and configured to support a second portion of the slider;
        a gimbal tether configured to reduce stress on a first portion of the gimbal by coupling the first portion of the gimbal to a second portion of the gimbal; and
        a flexible tether configured to restrict vertical movement of the slider, wherein a length of the flexible tether is greater than a length of the gimbal tether.

2. The head gimbal assembly of claim 1, wherein the gimbal further comprises an outer gimbal strut and wherein the gimbal tether couples the connector region to the outer gimbal strut.

3. The head gimbal assembly of claim 1, wherein the gimbal further comprises an outer gimbal strut and a middle gimbal strut, and wherein the gimbal tether couples the middle gimbal strut to the outer gimbal strut.

4. The head gimbal assembly of claim 1, wherein the gimbal tether comprises polyimide.

5. The head gimbal assembly of claim 1, wherein the gimbal tether comprises an inner edge and an outer edge, wherein the inner edge is parallel to the outer edge.

6. The head gimbal assembly of claim 5, wherein the inner edge is straight.

7. The head gimbal assembly of claim 1, wherein a length of the gimbal tether is approximately 0.1 millimeters.

8. The head gimbal assembly of claim 1, wherein the flexible tether is curved.

9. The head gimbal assembly of claim 1, wherein the flexible tether is coupled to the gimbal at three or more locations.

10. The head gimbal assembly of claim 1, wherein a stiffness of the flexible tether is less than the stiffness of the gimbal tether.

11. The head gimbal assembly of claim 1, wherein the gimbal tether is not electrically active.

12. A hard disk drive, comprising:
    magnetic media; and
    a head gimbal assembly comprising:
        a slider;
        a load beam;
        a flexure comprising:
            a first end extending along the load beam through a center region of a longitudinal axis of the head gimbal assembly;
            a second end comprising a plurality of bond pads electrically coupled to a slider; and
        a gimbal affixed to the load beam, the gimbal comprising:
            a connector region that couples to a distal region of the load beam;
            a stator region configured to support a first portion of the slider;
            a central tongue region disposed between the connector region and the stator region and configured to support a second portion of the slider;
            a gimbal tether configured to reduce stress on a first portion of the gimbal by coupling the first portion of the gimbal to a second portion of the gimbal; and
        a flexible tether configured to restrict vertical movement of the slider, wherein a length of the flexible tether is greater than a length of the gimbal tether.

13. The hard disk drive of claim 12, wherein the gimbal further comprises an outer gimbal strut and wherein the gimbal tether couples the connector region to the outer gimbal strut.

14. The hard disk drive of claim 12, wherein the gimbal further comprises an outer gimbal strut and a middle gimbal strut, and wherein the gimbal tether couples the middle gimbal strut to the outer gimbal strut.

15. The hard disk drive of claim 12, wherein the gimbal tether comprises polyimide.

16. The hard disk drive of claim 12, wherein the gimbal tether comprises an inner edge and an outer edge, wherein the inner edge is parallel to the outer edge.

17. The hard disk drive of claim 16, wherein the inner edge is straight.

18. The hard disk drive of claim 16, wherein a length of the gimbal tether is approximately 0.1 millimeters.

19. The hard disk drive of claim 12, wherein the flexible tether is curved.

20. The hard disk drive of claim 12, wherein a stiffness of the flexible tether is less than the stiffness of the gimbal tether.

* * * * *